United States Patent
Cheon (10) Patent No.: US 8,151,948 B2
(45) Date of Patent: Apr. 10, 2012

(54) SINGLE MOTOR ELECTRONIC WEDGE BRAKE SYSTEM LOCKING PARKING FORCE

(75) Inventor: Jaeseung Cheon, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1192 days.

(21) Appl. No.: 11/934,176

(22) Filed: Nov. 2, 2007

(65) Prior Publication Data

US 2009/0071769 A1 Mar. 19, 2009

(30) Foreign Application Priority Data

Sep. 17, 2007 (KR) .......... 10-2007-0094124

(51) Int. Cl.
*F16D 55/08* (2006.01)
*F16D 63/00* (2006.01)

(52) U.S. Cl. .......... 188/72.7; 188/70 B; 188/72.8; 188/72.9; 188/265; 188/106 P; 188/196 V; 188/162

(58) Field of Classification Search .......... 188/70 B, 188/72.7, 72.8, 72.9, 265, 106 P, 196 V, 162
See application file for complete search history.

(56) References Cited

U.S. PATENT DOCUMENTS

| | | | |
|---|---|---|---|
| 6,464,308 B2* | 10/2002 | Kubota | 303/20 |
| 6,978,868 B2 | 12/2005 | Schautt | |
| 6,997,290 B2* | 2/2006 | Juneau et al. | 188/72.7 |
| 2003/0183790 A1 | 10/2003 | Ji et al. | |
| 2004/0011981 A1 | 1/2004 | Ahn | |
| 2004/0013549 A1 | 1/2004 | Ahn | |
| 2004/0262098 A1* | 12/2004 | Baumann et al. | 188/72.8 |
| 2004/0262101 A1* | 12/2004 | Baumann et al. | 188/79.51 |
| 2006/0112995 A1 | 6/2006 | Kwon | |
| 2007/0227837 A1* | 10/2007 | Barbosa et al. | 188/72.7 |

FOREIGN PATENT DOCUMENTS

KR 10-20070065114 6/2007

OTHER PUBLICATIONS

U.S. Appl. No. 11/934,183 to Kim, which was filed on Nov. 2, 2007.

* cited by examiner

*Primary Examiner* — Bradley King
*Assistant Examiner* — Mahbubur Rashid
(74) *Attorney, Agent, or Firm* — Greenblum & Bernstein P.L.C.

(57) ABSTRACT

While driving one motor, an electronic wedge brake (EWB) system according to an embodiment of the present invention implements a main braking function by self-energizing caused by a wedge operation. Since only one motor is used, it is possible to reduce the number of parts and to simplify the structure. Further, the electronic wedge brake system implements various functions, such as a function for maintaining a set clearance of a pad, a wheel lock prevention function, and an EPB function by using a solenoid interlocked with a NSL (Non-Self Locking) type screw that is moved in an axial direction and supports an axial reaction force transmitted from a pad. Furthermore, a NSL (Non-Self Locking) type push rod shaft, which supports the axial reaction force, is constrained using power of the motor during park braking, and accordingly, even when the solenoid is turned off, it is possible to stably and reliably park a vehicle.

9 Claims, 9 Drawing Sheets

<main braking>  — turning-on of solenoid (A)

<compensation for maintaining set clearance of pad>  — turning-off of solenoid (B)

<completing compensation for maintaining set clearance of pad>  — turning-on of solenoid (C)

SINGLE MOTOR ELECTRONIC WEDGE BRAKE SYSTEM LOCKING PARKING FORCE

CROSS-REFERENCE TO RELATED APPLICATIONS

The present application is based on, and claims priority from, Korean Application Serial Number 10-2007-0094124, filed on Sep. 17, 2007, the disclosure of which is hereby incorporated by reference herein in its entirety.

FIELD OF THE INVENTION

The present invention relates to an EMB (Electronic Mechanical Brake), and more particularly, to a single motor electronic wedge brake system locking parking force.

BACKGROUND OF THE INVENTION

In general, a brake system is used to decelerate, stop, or park a moving vehicle.

Among brake systems, an electronic mechanical brake (EMB) system, which uses an electronically controlled motor as a power source in order to generate a braking force, generates a braking force without using hydraulic pressure. Therefore, the electronic mechanical brake system has a simpler structure as compared to a hydraulic pressure brake. Further, the electronic mechanical brake system comes into the spotlight as a brake system that can optimally implement various electronic devices and an integrated chassis.

During the braking, self-energizing of a wedge assembly operated by an actuator is performed in the electronic wedge brake (EWB) that is an example of the electronic mechanical brake (EMB) system. That is, a wedge is moved due to the drive of the actuator and presses the pad and a frictional force between the pad and the wheel disk serves as an additional input force. Due to the above-mentioned wedge operation, it is possible to obtain a large braking force for the performance of the motor.

In addition, the EWB can implement various additional functions, such as a function for maintaining a set clearance of a pad, a wheel lock prevention (or referred to as Fail-Safe) function for suppressing a brake failure to prevent a vehicle from being abnormally rotated during normal driving, and an EPB (Electronic Parking Brake) function.

The present applicant has filed several applications about the above-mentioned EWB to the Korean Intellectual Property Office. For example, the following brake system has been disclosed in Korean Patent Application No. 10-2007-0065114. The brake system implements a main braking function with power generated by one motor. Further, the brake system implements various additional functions, such as a function for maintaining a set clearance of a pad, a wheel lock prevention function, and an EPB (electronic parking brake) function, by using a NSL (Non-Self Locking) screw and a solenoid mechanism interlocked with a main braking motor.

However, if one motor is used as a main power source and a solenoid and a NSL (Non-Self Locking) screw are used as described above, an excessive load is applied to some components when a main braking function and various additional functions are implemented. For this reason, there is a problem in that the durability of the components may deteriorate.

In particular, the above-mentioned excessive load is applied during the implementing of an EPB (electronic parking brake) function. The EPB function requires a force, which is relatively smaller compared to the main braking function but is large. That is, when park braking is performed, a park braking force is maintained while the solenoid is turned off. Accordingly, it is difficult to constrain an axial reaction force transmitted from a pad by only using a NSL (Non-Self Locking) screw.

Therefore, there is a problem in that it is a little difficult to maintain a park braking force during park braking.

SUMMARY OF THE INVENTION

Embodiments of the present invention provide an electronic wedge brake (EWB) system that implements a main braking function by using power generated from one motor through self-energizing caused by a wedge operation. The electronic wedge brake system includes a solenoid mechanism and constrains a NSL (Non-Self Locking) screw by a motor assembly during a park braking. The solenoid mechanism is interlocked with a main braking motor, and implements various additional functions, such as a function for maintaining a set clearance of a pad, a wheel lock prevention (or referred to as Fail-Safe) function, and an EPB (electronic parking brake) function. Therefore, it is possible to prevent the release of a park braking force, which is caused by a limited constraining force of the NSL (Non-Self Locking) screw that supports an axial reaction force applied from a wheel disk to a pad. As a result, it is possible to more reliably maintain a park braking force.

According to an embodiment of the present invention, a parking force locking type single motor electronic wedge brake system includes a wedge structure, a NSL (Non-Self Locking) type push rod shaft, and a solenoid. When a pad is pressed against a wheel disk by using power generated from one motor driven by an electronic pedal used to brake a vehicle and an ECU receiving vehicle information signals, the wedge structure performs self-energizing by using a wedge roller. The NSL (Non-Self Locking) type push rod shaft supports an axial reaction force transmitted from the pad during operation. The solenoid is controlled by an ECU so as to restrain or release the push rod shaft. The wedge structure for performing self-energizing includes a wedge roller, a solenoid, and a spindle assembly. The wedge roller implements a wedge operation between a wedge moving plate, which moves an inner pad of a wedge caliper provided to the wheel disk, and a wedge base plate provided on a side opposite to the wedge moving plate, by using an axial linear motion converted from torque of the motor controlled by the ECU. The solenoid includes a push rod shaft and a switching lever. The push rod shaft is positioned at the base plate and has NSL type threads screwed to a supporting nut having NSL type threads together with a spring in order to support an axial reaction force transmitted from the pad. As the solenoid is controlled by the ECU, the switching lever is engaged with or separated from a latch of the push rod shaft in order to restrain or release an axial movement of the push rod shaft. The spindle assembly is connected to the motor, is moved in an axial direction due to the torque of the motor, and is engaged with the push rod shaft to constrain the push rod shaft so that the push rod shaft disperses an axial reaction force transmitted from the supported pad toward the motor when the solenoid is turned off during park braking.

The spindle assembly may be moved so as to correspond to a main braking axial movement stroke due to the rotation of the motor, and may be further moved so as to correspond to a park braking axial movement stroke due to the further driving of the motor.

For this purpose, the spindle assembly may include a power converting case, a NSL (Non-Self Locking) unit, a SL (Self Locking) unit, an interlocking rod, and an EPB lever. The power converting case surrounds a motor connecting shaft so that the motor connecting shaft passes through the power converting case and the power converting case is moved in an axial direction when the motor is driven. The NSL (Non-Self Locking) unit is provided between the power converting case and the motor connecting shaft passing through the power converting case, and is moved in the ranges of stroke A for main braking and stroke B for park braking. Further, the NSL (Non-Self Locking) unit has a large lead angle not to be constrained forcibly. The SL (Self Locking) unit has a lead angle so that the axial movement thereof is forcibly constrained after the SL (Self Locking) unit is moved to the range of stroke B. The interlocking rod transmits an axial moving force for a wedge operation. The EPB lever is moved during the park braking so as to be engaged with the push rod shaft.

The NSL (Non-Self Locking) unit may include a NSL (Non-Self Locking) screw and a NSL sun screw. The NSL (Non-Self Locking) screw is formed on an inner surface of a main hole formed in a case body of the power converting case. The NSL sun screw is formed on an outer periphery of the motor connecting shaft passing through the main hole.

Alternatively, the NSL (Non-Self Locking) unit may include a NSL (Non-Self Locking) screw, a NSL sun screw, and a planetary screw set. The NSL (Non-Self Locking) screw is formed on an inner surface of a main hole formed in a case body of the power converting case. The NSL sun screw is formed on an outer periphery of the motor connecting shaft passing through the main hole. The planetary screw set is engaged with the NSL screw and the sun screw.

The SL (Self Locking) unit may include a stationary SL (Self Locking) screw and a movable SL (Self Locking) screw. The stationary SL (Self Locking) screw is formed at the end portion of the case body. The movable SL (Self Locking) screw is formed at a portion of the motor connecting shaft, which protrudes beyond the case body.

The stationary SL screw may be formed at a small diameter boss that is formed at the end portion of the case body so as to decrease a diameter of the main hole.

The stationary SL screw may be directly formed on an inner surface of an end portion of the main hole, which passes through the case body.

According to an embodiment of the present invention, an electronic wedge brake (EWB), which performs a self-energizing wedge operation, uses power generated form one motor. Further, a solenoid mechanism is interlocked with a motor. Furthermore, while the solenoid is turned off during park braking, a park braking force, which can be constrained by the NSL (Non-Self Locking) screw, is forcibly constrained. Therefore, it is advantageous in that it further improves reliability in maintaining a park braking force.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

A preferred embodiment of the present invention will be described in detail below with reference to the accompanying drawings. Since the embodiment may be modified in various ways by those skilled in the art, the present invention is not limited to the embodiment.

Figure 1:
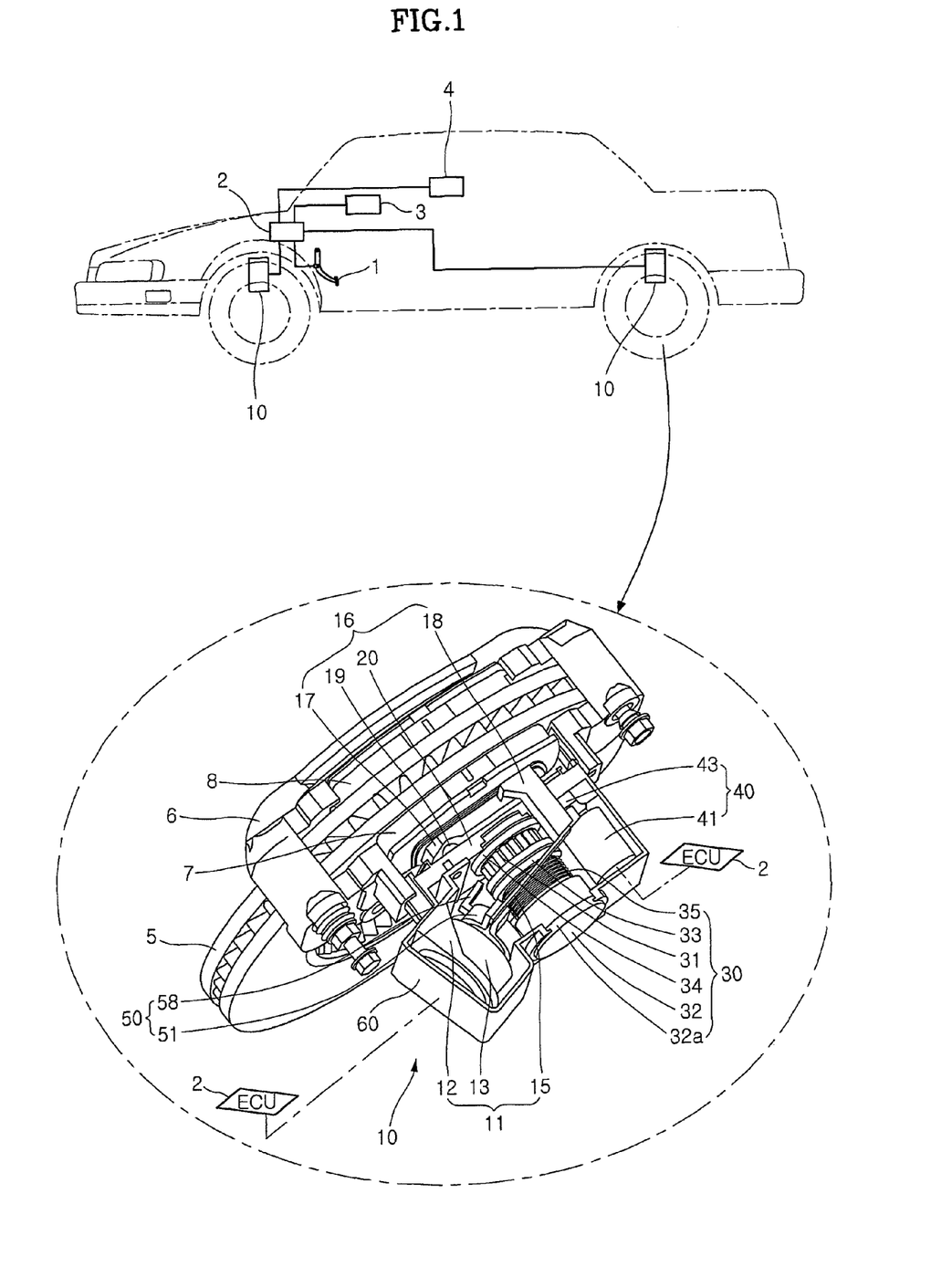
FIG. 1 is a view showing the configuration of a parking force locking type single motor electronic wedge brake system according to an embodiment of the present invention.

FIG. 1 is a view showing the configuration of a parking force locking type single motor electronic wedge brake system according to an embodiment of the present invention. In a parking force locking type single motor electronic wedge brake system according to an embodiment of the present invention, when a driver operates an electronic pedal 1 in order to brake a vehicle, an ECU 2 generates control signals in consideration of vehicle information. Accordingly, wedge actuator assemblies 10, which are provided on wedge calipers 6 surrounding wheel disks 5, implement a braking function and various additional functions by using power generated from one motor 13 driven by ECU 2.

That is, each of wedge actuator assemblies 10 includes one motor 13 and a wedge structure in order to implement a main braking function for pressing pads against a wheel disk 5. Motor 13 is driven by ECU 2, and the wedge structure is moved by motor 13 to perform self-energizing. Each of the wedge actuator assemblies further includes a solenoid 41 and a NSL (Non-Self Locking) screw device, which are interlocked with each other when a function for maintaining a set clearance of a pad, a wheel lock prevention (or referred to as Fail-Safe) function, and an EPB (Electronic Parking Brake) function are implemented.

In addition, the single motor electronic wedge brake system further includes a spindle assembly 50. When the EPB (Electronic Parking Brake) function is implemented, the spindle assembly fixes the NSL (Non-Self Locking) screw by using the axial movement stroke of motor 13 while solenoid 41 is turned off.

The single motor electronic wedge brake system further includes an auxiliary battery 4 that is used as a spare battery for ECU 2, the motors 13 of actuator assemblies 10, and solenoids 41.

Further, when the EPB (Electric Parking Brake) is operated, the single motor electronic wedge brake system receives signals so that ECU 2 perceives a parking brake conversion state. This is performed using a parking brake button, which generates separate electric signals corresponding to portions of a driver's seat and supplies the signals to ECU 2.

The single motor electronic wedge brake system further includes housings 60 in which wedge actuator assemblies 10 are received, respectively. Each of housings 60 is fixed to wedge caliper 6.

In this case, wedge caliper 6 and housing 60 may be fixed to each other in various ways. For example, housing 60 may have a guide that protrudes and is inserted into wedge caliper 6. Accordingly, the housing is fixed to the wedge caliper.

ECU 2 performs a control required for braking on the basis of information about a pushing distance of electronic pedal 1 to be operated and information about an attitude of a vehicle obtained from a yaw moment sensor 3 provided in the vehicle.

In addition, various sensors are provided to wedge caliper 6 and wedge actuator assembly 10 fixed to the wedge caliper, so that measurement signals are transmitted to ECU 2. For example, wheel speed sensors (WSS) for measuring the speed of a wheel, and load sensors used to control a braking force may be provided to the wedge caliper and the wedge actuator assembly.

Further, wedge caliper 6 includes inner and outer pads 7 and 8 that cover wheel disk 5 rotating together with the wheel and are provided on both sides of wheel disk 5 to press wheel disk 5.

Wedge caliper 6 includes a torque member for performing an interlocking operation (the operation of a general caliper type brake) so that outer pad 8 provided on the opposite side to the inner pad is also moved toward wheel disk 5 when inner pad 7 is pressed against wheel disk 5.

Further, each of wedge actuator assemblies 10 includes a braking motor unit 11, a wedge braking unit 16, and a solenoid mechanism. Braking motor unit 11 generates a braking force with power, which is generated by one motor 13 controlled by ECU 2. Wedge braking unit 16 is interlocked with braking motor unit 11 so as to press inner and outer pads 7 and 8 against wheel disk 5 at one side of wedge caliper 6. The solenoid mechanism is interlocked with the NSL (Non-Self Locking) screw device so as to implement a function for maintaining set clearances of inner and outer pads 7 and 8 and a wheel lock prevention function so that a malfunction of motor 13 or other factors are prevented.

In this case, braking motor unit 11 generates power, which is used to implement the brake function, by the control of ECU 2 during the braking. Braking motor unit 11 operates wedge braking unit 16, which presses inner pad 7 provided on one side of wheel disk 5, by using one motor 13 provided on one side of housing 60, which is fixed to the side of wedge caliper 6, as a power source.

In addition, braking motor unit 11 is allowed to use an axial movement stroke that is converted by the torque of motor 13, that is, have stroke larger than the axial movement stroke during main braking. Accordingly, when solenoid 41 is turned off and the EPB (Electronic Parking Brake) function is implemented, braking motor unit 11 forcibly constrains the NSL (Non-Self Locking) screw, to which an axial reaction force is transmitted from the pad without the constraining force of solenoid 41. Therefore, it is possible to obtain the more reliable performance of an EPB.

For this purpose, as shown in FIG. 2A, braking motor unit 11 includes motor 13, an interlocking rod 15, and a spindle assembly 50. Motor 13 is fixed by a fixed bracket 12 that is fixed to housing 60 fixed to the side of wedge caliper 6, and is controlled by ECU 2. Interlocking rod 15 is moved by power of motor 13 that is converted into a linear force in an axial direction. Spindle assembly 50 is fixed to a motor connecting shaft 14 of motor 13, and is moved forward and backward in an axial direction depending on the drive of the motor. The spindle assembly forms stroke A used for main braking and stroke B used to forcibly constrain the NSL (Non-Self Locking) screw.

Further, interlocking rod 15 diagonally crosses housing 60 and is positioned on the side opposite to motor 13. Interlocking rod 15 is moved in the axial direction by spindle assembly 50, which corresponds to the drive of motor 13. Further, interlocking rod 15 is composed of a pair of upper and lower pieces so that an axial moving force is uniformly transmitted.

The reason for the diagonal arrangement of interlocking rod 15 is to utilize the space in housing 60, and housing 60 is made more compact by reducing the space in housing 60, which is occupied by interlocking rod 15.

In addition, when motor 13 is driven and motor connecting shaft 14 is rotated, the inner surface of spindle assembly 50 is engaged with threads formed on the outer periphery of motor connecting shaft 14. Accordingly, the spindle assembly is moved forward and backward in the axial direction depending on the rotation direction of a rotating shaft.

For this purpose, as shown in FIG. 2B, spindle assembly 50 includes a power converting case 51 and axial motion means. Power converting case 51 surrounds motor connecting shaft 14 so that the motor connecting shaft passes through the power converting case and the power converting case is moved in an axial direction when motor 13 is driven. The axial motion means is provided between the power converting case and motor connecting shaft 14 passing through power converting case 51, and forms stroke A+B for main braking and park braking.

In addition, interlocking rod 15 and an EPB lever 58 are combined with power converting case 51. Interlocking rod 15 has stroke A for the main braking. EPB lever 58 has stroke B for the park braking, and forcibly constrains the NSL (Non-Self Locking) screw that supports an axial reaction force transmitted from the pad instead of solenoid 41.

In this case, the pieces of interlocking rod 15 are combined with upper and lower portions of power converting case 51. Meanwhile, EPB lever 58 is combined with the side surface of power converting case 51, and is positioned at push rod shaft 31 forming the NSL (Non-Self Locking) screw.

Due to the positional relationship between motor 13 and push rod shaft 31, EPB lever 58 has a shape bent as shown in FIG. 2A. The end of EPB lever 58 has a shape to be easily engaged with a latch 31a of push rod shaft 31.

Further, the axial motion means includes a NSL (Non-Self Locking) unit and a SL (Self Locking) unit. The NSL (Non-Self Locking) unit is moved in the range of stroke A for the main braking and the range of stroke B for the park braking. The SL (Self Locking) unit is moved to the range of stroke B. Then, the axial movement of the SL (Self Locking) unit is forcibly constrained. The SL (Self Locking) unit is positioned on the front side of the NSL (Non-Self Locking) unit.

The NSL (Non-Self Locking) unit includes a NSL (Non-Self Locking) screw 53 and a NSL sun screw 56. NSL (Non-Self Locking) screw 53 is formed on the inner surface of a main hole 53a formed in a case body 52 of power converting case 51. NSL sun screw 56 is formed on the outer periphery of motor connecting shaft 14 that passes through main hole 53a.

Further, since NSL screw 53 and NSL sun screw 56 use a NSL (Non-Self Locking) screw, that is, a screw having a large lead angle, the NSL sun screw is not constrained by the NSL screw. Accordingly, when a force is applied to the case body in an axial direction, the case body is automatically rotated and moved in the axial direction due to the large lead angle.

Furthermore, the NSL (Non-Self Locking) unit provides a planetary screw set 55 between NSL screw 53 and NSL sun screw 56. Accordingly, even though the lead angle corresponding to the NSL (Non-Self Locking) unit is not made large, it is possible to obtain the same effect as when the lead angle is large.

Figure 3:
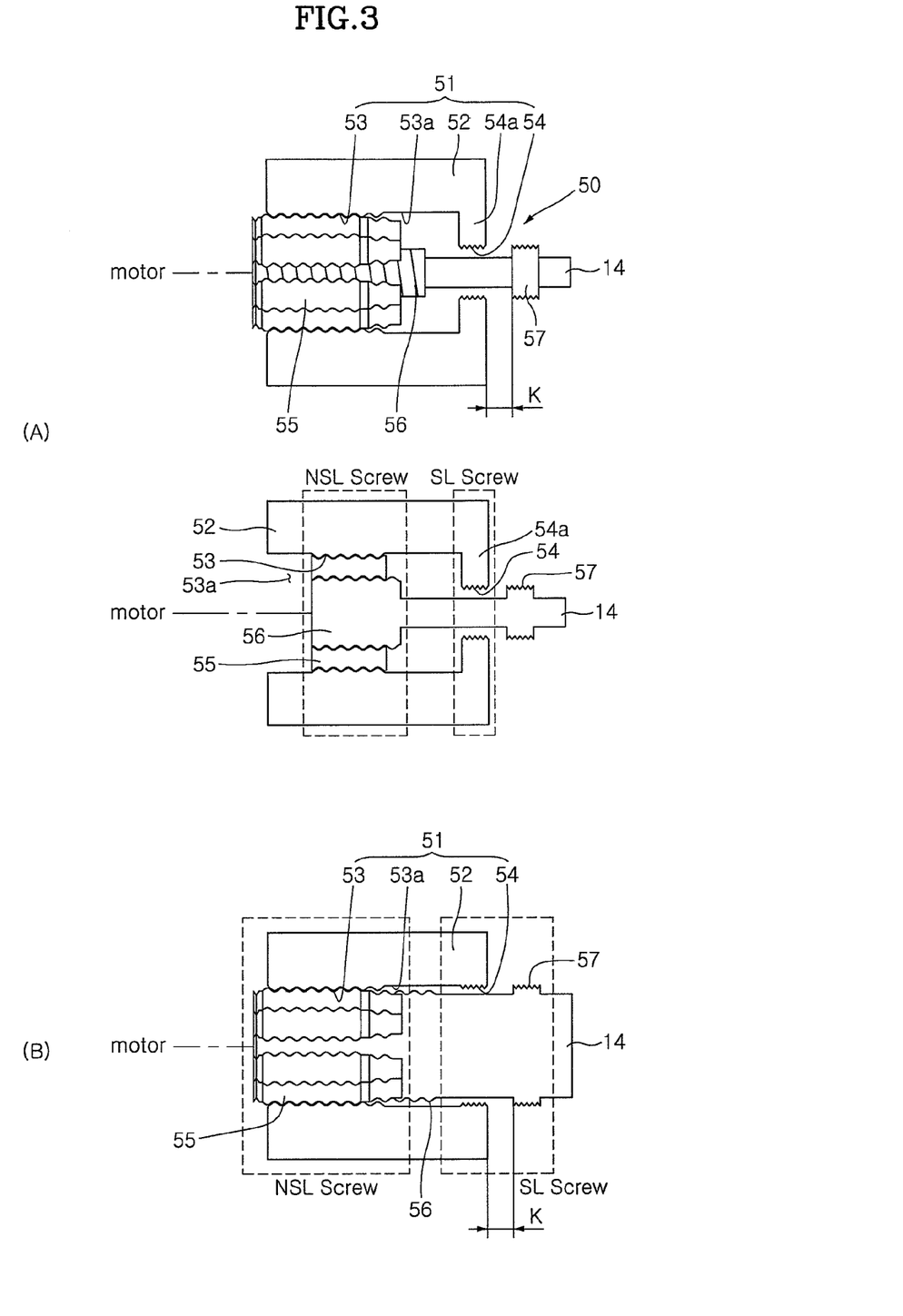
FIGS. 3A and 3B are views showing the modification of the motor assembly, which locks a park braking force, according to the embodiment of the present invention.

The reason for this is as follows: as shown in FIG. 3A, the NSL (Non-Self Locking) unit includes a NSL (Non-Self Locking) screw 53, a NSL sun screw 56, and a planetary screw set 55. NSL (Non-Self Locking) screw 53 is formed on the inner surface of a main hole 53a formed in a case body 52 of power converting case 51. NSL sun screw 56 is formed on the outer periphery of motor connecting shaft 14 that passes through main hole 53a. Planetary screw set 55 is engaged with NSL screw 53 and sun screw 56.

In this case, planetary screw set 55 includes a plurality of planetary screws, which is provided between NSL screw 53 and sun screw 56 and engaged with each other. The end of each of the planetary screws is combined with case body 52 so as to be freely rotated.

Each of NSL screw 53, sun screw 56, and planetary screw set 55 is a NSL (Non-Self Locking) screw. However, even though a lead angle is made smaller as compared to when NSL screw 53 is directly engaged with sun screw 56, the case body is automatically rotated and moved in the axial direction due to the operation of planetary screw set 55 when a force is applied to the case body in an axial direction.

Meanwhile, as shown in FIG. 2A, the SL (Self Locking) unit includes a stationary SL (Self Locking) screw 54 and a movable SL (Self Locking) screw 57. Stationary SL (Self Locking) screw 54 is formed at the end portion of case body 52, and movable SL (Self Locking) screw 57 is formed at a portion of motor connecting shaft 14 that protrudes beyond case body 52.

In this case, stationary SL screw 54 is formed at a small diameter boss 54a that is formed at the end portion of case body 52 so as to decrease the diameter of main hole 53a. A seal member such as an O-ring, which can easily seal case body 52, is provided to motor connecting shaft 14 received in main hole 53a of case body 52 so that the O-ring comes in contact with small diameter boss 54a of case body 52 when not operated. Accordingly, the O-ring prevents foreign substances from flowing into case body 52.

In contrast, stationary SL screw 54 may be directly formed at the end portion of case body 52. That is, as shown in FIG. 3B, the stationary SL screw may be directly formed on the inner surface of the end portion of main hole 53a, which passes through case body 52, without forming small diameter boss 54a that is formed at the end portion of case body 52 so as to decrease the diameter of main hole 53a.

If stationary SL screw 54 is directly formed on the inner surface of main hole 53a of case body 52 as described above, it is not necessary to change the shape of the motor connecting shaft 14 that has movable SL screw 57 to be engaged with stationary SL screw 54.

Further, each of stationary SL screw 54 and movable SL screw 57 is a general screw having a small lead angle. Even though an axial force is applied to the case body, the general screw does not allow the case body to rotate and move in the axial direction.

A distance K between stationary SL screw 54 and movable SL screw 57 corresponds to the park braking stroke B, which is larger than stroke A for the main braking in the forward direction during the park braking. For this purpose, the distance K is determined in consideration of a lead angle of the NSL (Non-Self Locking) screw of the NSL (Non-Self Locking) unit, which is determined in consideration of stroke A+B.

In addition, wedge braking unit 16 of the brake system according to the embodiment of the present invention performs self-energizing by using the wedge structure so as to increase a force for pulling the pads. The wedge braking unit is fixed at one side of wedge roller 19, and is movable by an axial moving force generated by motor 13 at the other side of the wedge roller.

For this purpose, wedge braking unit 16 includes a wedge moving plate 17, a wedge base plate 20, and a wedge roller 19. Wedge moving plate 17 is moved by a connecting rod 18 to which an axial moving force generated by motor 13 is applied. Wedge base plate 20 is arranged parallel to wedge moving plate 17 on the opposite side so as to face wedge moving plate 17. Wedge roller 19 is provided between rolling contact surfaces 17a and 20a that are formed between a pair of plates 17 and 20, and generates a frictional force.

In this case, wedge moving plate 17 is combined with inner pad 7 so as to press inner pad 7, which is positioned on a side of wheel disk 5 opposite to outer pad 8, against wheel disk 5.

Wedge base plate 20 is stationary with respect to wedge moving plate 17, which is moved by the power of motor 13. For this purpose, wedge base plate 20 is formed using a part of housing 60 fixed to the side of wedge caliper 6.

Connecting rod 18 is fixed to an end of interlocking rod 15. The interlocking rod is moved in an axial direction by spindle assembly 50, which is used as a linear motion converter and is moved depending on the drive of motor 13. The connecting rod moves wedge moving plate 17 in a direction where interlocking rod 15 is moved.

Further, connecting rod 18 extends perpendicular to the surface of the wedge moving plate at upper and lower portions of wedge moving plate 17, and is fixed to the end of interlocking rod 15 by bolts or the like.

Wedge roller 19 is provided between the pair of plates 17 and 20 facing each other, and has a cylindrical shape. The wedge roller causes a wedge phenomenon where self-energizing is performed by a frictional force generated depending on the behavior of plates 17 and 20, and then applies an input force to press the pad.

For this purpose, wedge roller 19 is positioned between rolling contact surfaces 17a and 20a including a plurality of grooves, which has V-shaped cross sections and is formed on the surfaces of the pair of plates 17 and 20 facing each other. Rolling contact surfaces 17a and 20a including the plurality of grooves, which has V-shaped cross sections, and wedge roller 19 generate a frictional force. Further, rolling contact surfaces 17a and 20a make one plate (wedge plate 17) move toward the pad depending on the change in position of wedge roller 19.

The solenoid mechanism, which implements various additional functions in addition to a main braking function implemented using braking motor unit 11 and wedge braking unit 16 during the operation of the EWB, includes solenoid 41 and a NSL (Non-Self Locking) screw so as to implement a pad compensating function, a wheel lock prevention (or referred to as Fail-Safe) function, and an electric parking brake function. Solenoid 41 is controlled by ECU 2, and the NSL (Non-Self Locking) screw supports an axial reaction force transmitted from wheel disk 5 to the pad. The solenoid mechanism operates using an interaction between the solenoid and the NSL screw.

Figure 2:
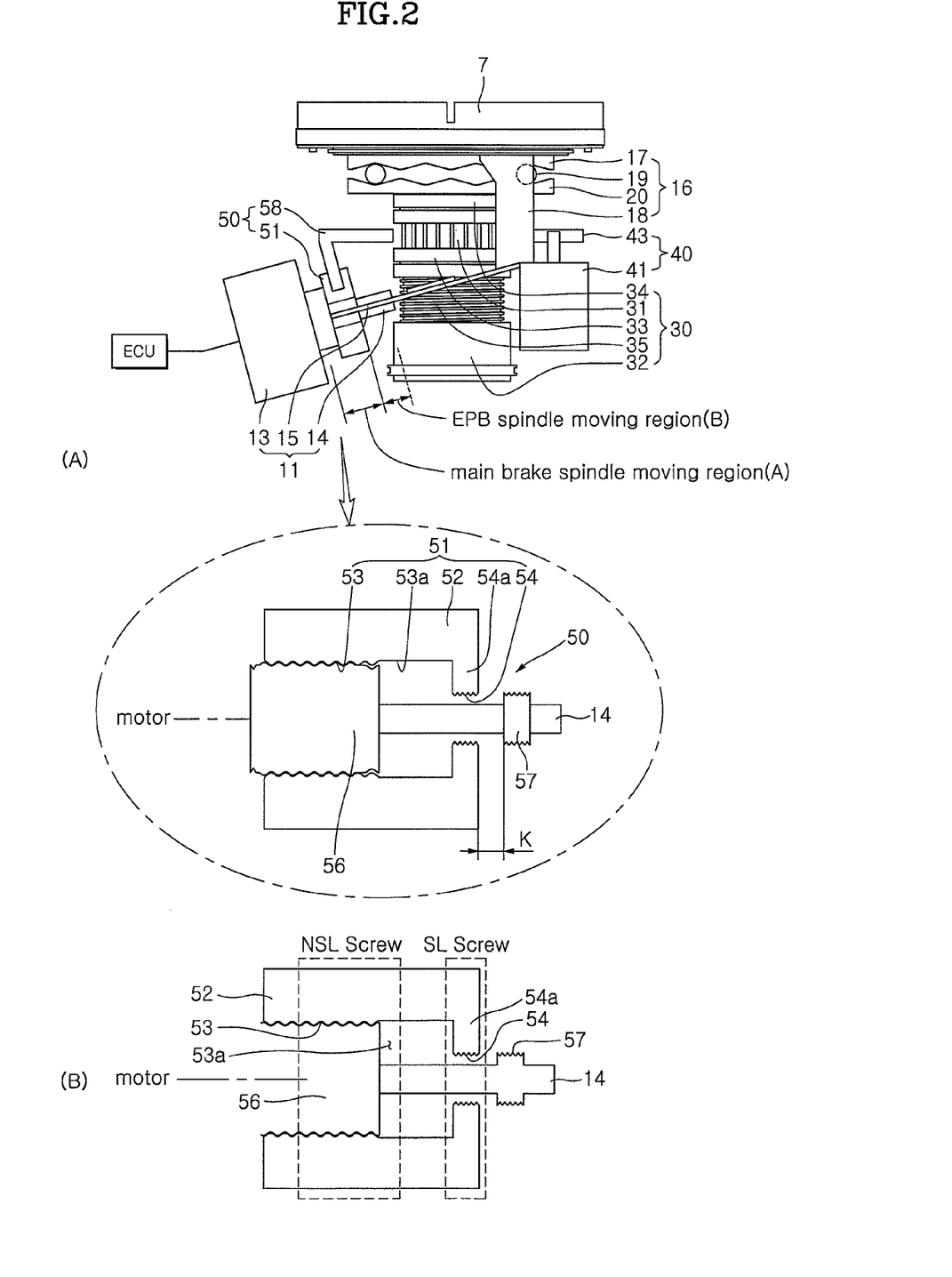
FIGS. 2A and 2B are views showing the structures of a motor assembly, which locks a park braking force, and a NSL (Non-Self Locking) screw according to the embodiment of the present invention.

For this purpose, as shown in FIGS. 1 and 2, the solenoid mechanism includes an adjusting unit 30 and a solenoid unit 40. Adjusting unit 30 is a NSL (Non-Self Locking) screw that supports the axial reaction force transmitted from wheel disk 5 to the pad when the pad compensating function, the wheel lock prevention function, and the electric parking brake function are implemented. Solenoid unit 40 is turned on or off to operate adjusting unit 30, and releases or applies a constraining force.

Accordingly, adjusting unit 30 includes a push rod shaft 31 and a spring 35. Push rod shaft 31 has a NSL (Non-Self Locking) type push rod screw 31b formed on the outer periphery thereof so as to be screwed to a NSL (Non-Self Locking) type supporting nut 32 that is fitted and fixed to housing 60. The push rod shaft is moved in an axial direction while being rotated. One end of spring 35 is fixed to supporting nut 32, and the other end of the spring is positioned at a front bearing 33 so as to continuously apply an axial force to front bearing 33.

In this case, adjusting unit 30 is disposed at the central portion of wedge base plate 20 of wedge braking unit 16 so that a force applied by push rod shaft 31 is applied to wedge base plate 20.

Further, push rod shaft 31 and supporting nut 32 use a NSL (Non-Self Locking) screw, that is, a screw having a large lead angle. Accordingly, when a force is applied to the push rod shaft in an axial direction, the push rod shaft is automatically rotated due to the large lead angle and is moved in the axial direction.

In addition, adjusting unit 30 includes a latch 31a and front and rear bearings 33 and 34. Latch 31a is formed on the outer periphery of a portion of push rod shaft 31 without push rod screw 31b, and constrains push rod shaft 31 against the axial reaction force transmitted from the pad. Front and rear bearings 33 and 34 are disposed on the push rod shaft at the front and rear sides of latch 31a.

In this case, a needle bearing, which withstands an axial force and does not constrain rotation, is used as front bearing 33. A thrust bearing is used as rear bearing 34.

Solenoid unit 40 includes a solenoid 41 and a switching lever 43. Solenoid 41 is received at one side in housing 60 and turned on or off by ECU 2. Switching lever 43 comes in contact with or is separated from push rod shaft 31 by a movable shaft that protrudes or retreats during the operation of solenoid 41.

In this case, when solenoid 41 operates (is turned on), switching lever 43 is engaged with latch 31a of push rod shaft 31 and constrains push rod shaft 31 against the axial reaction force transmitted from the pad.

Further, since solenoid 41 of solenoid unit 40 is disposed parallel to the axial direction of push rod shaft 31 of adjusting unit 30, it is possible to improve the space utilization of the entire housing 60 including solenoid 41.

The operation of the single motor electronic wedge brake system according to the embodiment of the present invention will be described in detail below with reference to the accompanying drawings.

While driving one motor 13, the electronic wedge brake (EWB) system according to the embodiment of the present invention implements a main braking function by self-energizing caused by a wedge operation. Since only one motor is used, it is possible to reduce the number of parts and to simplify the structure. Further, the electronic wedge brake system implements various functions, such as a function for maintaining a set clearance of a pad, a wheel lock prevention (or referred to as Fail-Safe) function, and an EPB function by using solenoid 41 interlocked with the NSL (Non-Self Locking) type screw that is moved in the axial direction and supports an axial reaction force transmitted from the pad. Furthermore, the NSL (Non-Self Locking) type push rod shaft 31, which supports the axial reaction force, is constrained by using the power of motor 13 during park braking. Accordingly, even when solenoid 41 is turned off, it is possible to stably and reliably park a vehicle.

The electronic wedge brake system uses one motor 13 and implements a function for maintaining a set clearance of a pad, a wheel lock prevention function, and an EPB function except for the main braking by using a solenoid mechanism interlocked with a NSL (Non-Self Locking) type screw. In particular, the electronic wedge brake system includes a spindle assembly 50, which converts the torque of motor 13 into an axial moving force and further increases an axial stroke during the park braking as compared to during the main braking, in order to stabilize the park braking. Accordingly, after solenoid 41 is turned off, the NSL (Non-Self Locking) type push rod shaft 31 for supporting an axial reaction force is forcibly constrained due to the operation of spindle assembly 50. For this reason, it is possible to obtain these various characteristics of the present invention.

Accordingly, in the EWB according to the embodiment of the present invention, as shown in FIG. 1, a wedge caliper 6 including inner and outer pads 7 and 8 is provided at wheel disk 5 that is rotated together with a wheel. Further, a wedge actuator assembly 10, which is controlled by ECU 2 receiving operational information of electronic pedal 1, is provided in housing 60, and is fixed to the side of wedge caliper 6.

Wedge actuator assembly 10 includes one motor 13 controlled by ECU 2, and wedge braking unit 16. Wedge braking unit 16 has a wedge roller 19 that generates an input force pressing the pad due to self-energizing while moving the pad as the torque of the motor is converted into an axial moving force by spindle assembly 50. In this case, self-energizing is caused by the change in position of the wedge roller depending on the behavior of wedge roller 19 with respect to the pad.

In addition, wedge actuator assembly 10 further includes adjusting unit 30. Adjusting unit 30 performs an adjustment function for maintaining a clearance between wheel disk 5 and the pad when the pad is abraded. Further, adjusting unit 30 includes a NSL (Non-Self Locking) screw, which is interlocked with solenoid 41 by switching lever 43, so as to implement the wheel lock prevention for releasing the pressing of wedge braking unit 16 when motor 13 malfunctions in a braking state.

Further, wedge actuator assembly 10 further includes EPB lever 58. While solenoid 41 is turned off, EPB lever 58 forcibly performs the EPB function of the electric brake during the braking, that is, constrains the NSL (Non-Self Locking) type push rod shaft 31 for supporting the axial reaction force.

As shown in FIG. 2A, EPB lever 58 is connected to spindle assembly 50, which converts the torque of motor 13 into an axial moving force and forms stroke A+B for main braking and park braking. For this reason, it is possible to use power of motor 13 that generates an axial moving force for pressing the pad during the park braking by using ECU 2.

The operation, which is performed by the EWB according to the embodiment of the present invention using one motor 13, will be classified into the main braking function and the various additional functions, such as a function for maintaining a set clearance of a pad, a wheel lock prevention function, and a park braking EPB function, and will be described in detail below.

In the main braking function of the present invention, when ECU 2 generates control signals by analyzing information about a pushing distance of electronic pedal 1 and information about a running vehicle obtained from various sensors, motor 13 controlled by ECU 2 is driven and spindle assembly 50 generates an axial moving force in the axial direction, that is, in a direction where the linear motion converter protrudes from motor 13 (braking against forward movement) or retreats toward motor 13 (braking against backward movement) depending on the rotational direction of motor 13.

Subsequently, the axial moving force of spindle assembly 50 caused by motor 13 moves interlocking rod 15, and the movement of interlocking rod 15 causes wedge moving plate 17 and the pad to be continuously and linearly moved by connecting rod 18 that is fixed to the end of the interlocking rod. Accordingly, a braking force for pressing the pad against wheel disk 5 is generated due to the operation of the wedge structure using wedge roller 19.

In this case, wedge moving plate 17, which is connected to connecting rod 18, moves inner pad 7 provided on the side surface by the axial moving force converted from the torque of motor 13. However, wedge base plate 20, which is integrally formed with housing 60, is maintained in a relatively stationary state.

Figure 4:
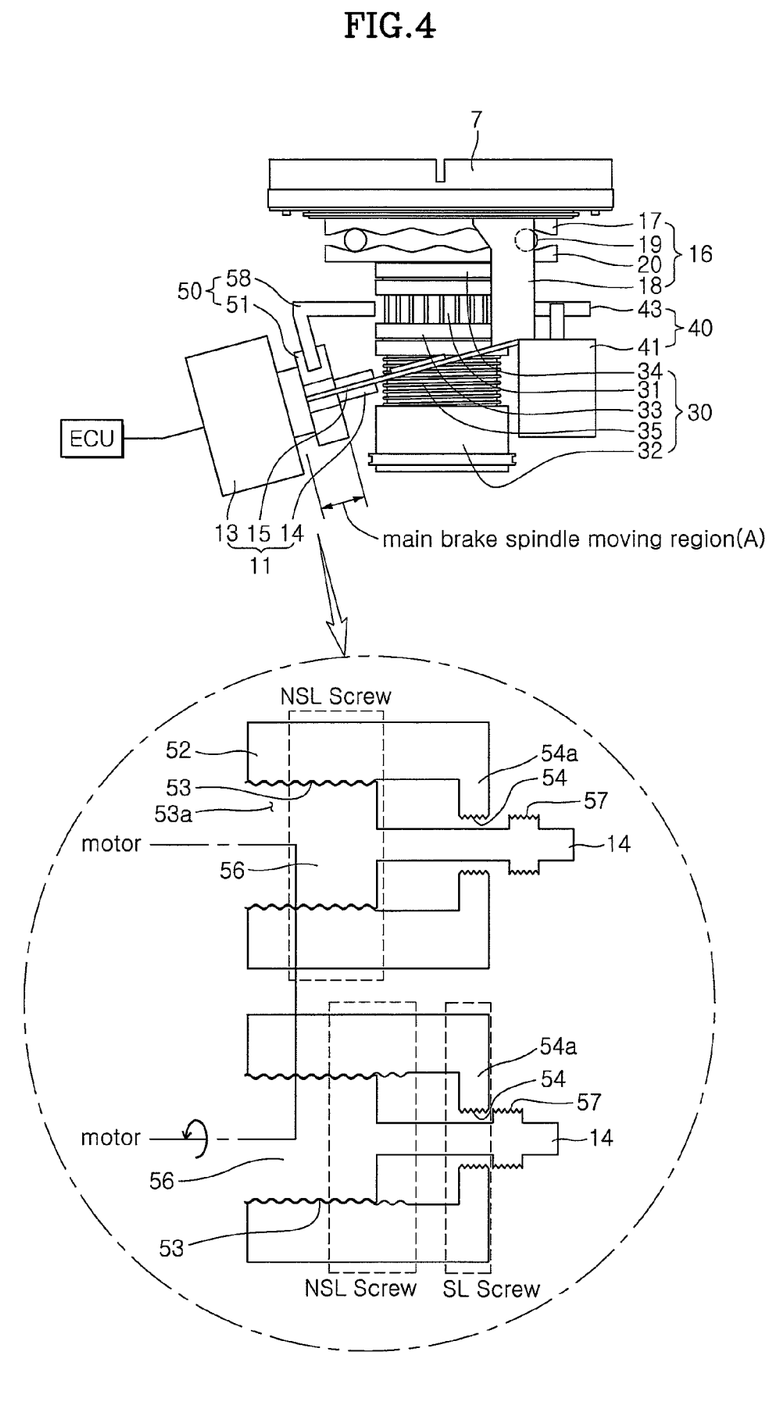
FIG. 4 is a view illustrating the operation of the motor assembly, which locks a park braking force, according to the embodiment of the present invention during main braking.

The axial moving force is generated by spindle assembly 50 that converts the torque of motor 13 into an axial motion. That is, as shown in FIG. 4, when motor connecting shaft 14 is rotated together with motor 13, the NSL (Non-Self Locking) unit of spindle assembly 50 moves interlocking rod 15 to stroke A (main brake spindle moving region) for the main braking due to the rotation of motor connecting shaft 14.

While causing connecting rod 18 to be moved, the axial movement stroke A of interlocking rod 15 causes inner and outer pads 7 and 8 to be pressed against wheel disk 5 by the wedge operation among wedge moving plate 17, wedge roller 19, and wedge base plate 20.

When NSL sun screw 56 of the NSL (Non-Self Locking) unit is rotated by motor connecting shaft 14, NSL screw 53 engaged with sun screw 56 is rotated. Further, while being rotated, case body 52 including NSL screw 53 is moved in the axial direction by the operation of the NSL screw.

Accordingly, case body 52 including NSL screw 53, that is, power converting case 51 is moved along motor connecting shaft 14 in the axial direction to stroke A (main brake spindle moving region) for the main braking.

In this case, the SL (Self Locking) unit, which is formed at the front end of power converting case 51, does not operate. The reason for this is as follows: ECU 2 controls motor 13 so that case body 52 is moved to a portion (stroke A) positioned before movable SL screw 57, which is formed on motor connecting shaft 14.

Meanwhile, during the above-mentioned operation, if the NSL (Non-Self Locking) unit includes planetary screw set 55, that is, planetary screw set 55 is provided between NSL sun screw 56 and NSL screw 53 as shown in FIGS. 3A and 3B, NSL sun screw 56 rotated by motor connecting shaft 14 rotates planetary screw set 55 and planetary screw set 55 rotates NSL screw 53 engaged therewith. For this reason, power converting case 51 is moved due to the rotation of case body 52 including NSL screw 53.

That is, power converting case 51 is moved in the axial direction by motor 13 to stroke A (main brake spindle moving region) for the main braking.

In this case, the SL (Self Locking) unit, which is formed at the front end of power converting case 51, does not operate. The reason for this is as follows: ECU 2 controls motor 13 so that case body 52 is moved to a portion (stroke A) positioned before movable SL screw 57, which is formed on motor connecting shaft 14.

Figure 5:
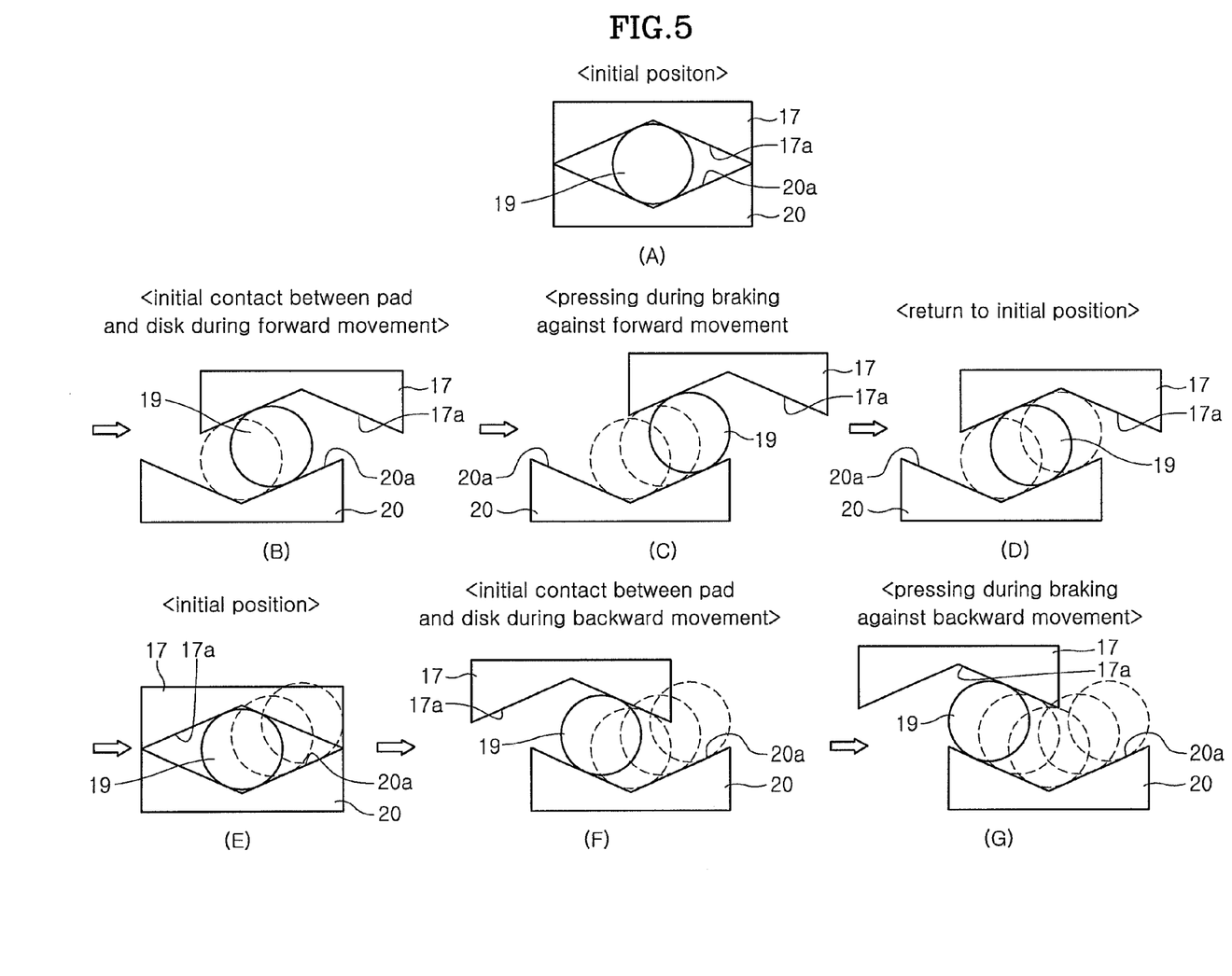
FIG. 5 is a view illustrating the wedge operation of the single motor electronic wedge brake system according to the embodiment of the present invention during main braking.

When the case body is moved to the main brake spindle moving region A in the axial direction by spindle assembly 50 as described above, wedge roller 19, which is positioned at the central portion between rolling contact surfaces 17a and 20a of wedge moving plate 17 and the fixed wedge base plate 20, is sequentially moved as shown in FIGS. 5A to 5C and performs a wedge operation.

That is, as wedge moving plate 17 is moved forward, wedge roller 19 is moved from the central portion between rolling contact surfaces 17a and 20a to the outside. The movement of wedge roller 19 with respect to rolling contact surfaces 17a and 20a causes wedge moving plate 17 to be further separated from wedge base plate 20.

Accordingly, wedge moving plate 17 is linearly moved and causes a clearance due to the change in position of wedge roller 19. The clearance between wedge moving plate 17 and wedge base plate 20 causes a wedge effect of wedge roller 19 where inner pad 7 generates an input force pressing wheel disk 5.

Subsequently, when braking is released, ECU 2 drives motor 13 in a reverse direction so that spindle assembly 50 reversely operates. Accordingly, wedge moving plate 17 returns to the initial position as shown in FIGS. 5D and 5E. For this reason, wedge roller 19 also returns to the central position between rolling contact surfaces 17a and 20a. Therefore, a force applied by wedge moving plate 17 to the pad is released.

Further, even when a vehicle running backward is braked, a vehicle is braked in the same manner as when a vehicle running forward is braked. That is, ECU 2, which receives a signal of electronic pedal 1 and perceives the backward running of a vehicle, drives motor 13 in a reverse direction (forward running is referred to as driving in a normal direction).

Then, when motor 13 is driven in the reverse direction, spindle assembly 50 pulls interlocking rod 15 and connecting rod 18 toward motor 13. For this reason, wedge moving plate 17 is pushed and pushes inner pad 7 in the same direction (a direction opposite to a direction when a vehicle running forward is braked).

As shown in FIGS. 5F and 5G, the movement of wedge moving plate 17 causes wedge roller 19, which is positioned at the central portion between rolling contact surfaces 17a and 20a, to move, that is, causes wedge roller 19 to be moved to the outside of rolling contact surfaces 17a and 20a so that wedge moving plate 17 is further separated from wedge base plate 20. Therefore, wedge moving plate 17 generates an input force that presses inner pad 7 against wheel disk 5.

Subsequently, when the braking is released, ECU 2 drives motor 13 in a normal direction and allows wedge roller 19 to return to the central position between rolling contact surfaces 17a and 20a as shown in FIG. 5E, thereby releasing the braking force.

After the main braking function is completed, solenoid 41 is turned on. Accordingly, switching lever 43 is engaged with latch 31a of push rod shaft 31 due to the operation of solenoid 41. As a result, due to the constraint between switching lever 43 and latch 31a, push rod shaft 31 supports the axial reaction force transmitted form the pad.

Meanwhile, various additional functions of the EWB are implemented by adjusting unit 30, which is positioned at the central portion of wedge braking unit 16 and includes push rod shaft 31 having an NSL screw interlocked with solenoid 41. The various additional functions will be classified and described below.

When wheel lock of wedge roller 19 occurs or motor 13 malfunctions in the braking state, the wheel lock prevention function releases the pressing of wedge braking unit 16. First, the lock prevention function will be described. ECU 2 turns off solenoid 41 and releases the constraint on push rod shaft 31 for supporting the axial reaction force transmitted from the pad. Accordingly, it is possible to prevent a vehicle from abnormally behaving due to an undesired braking force.

Figure 6:
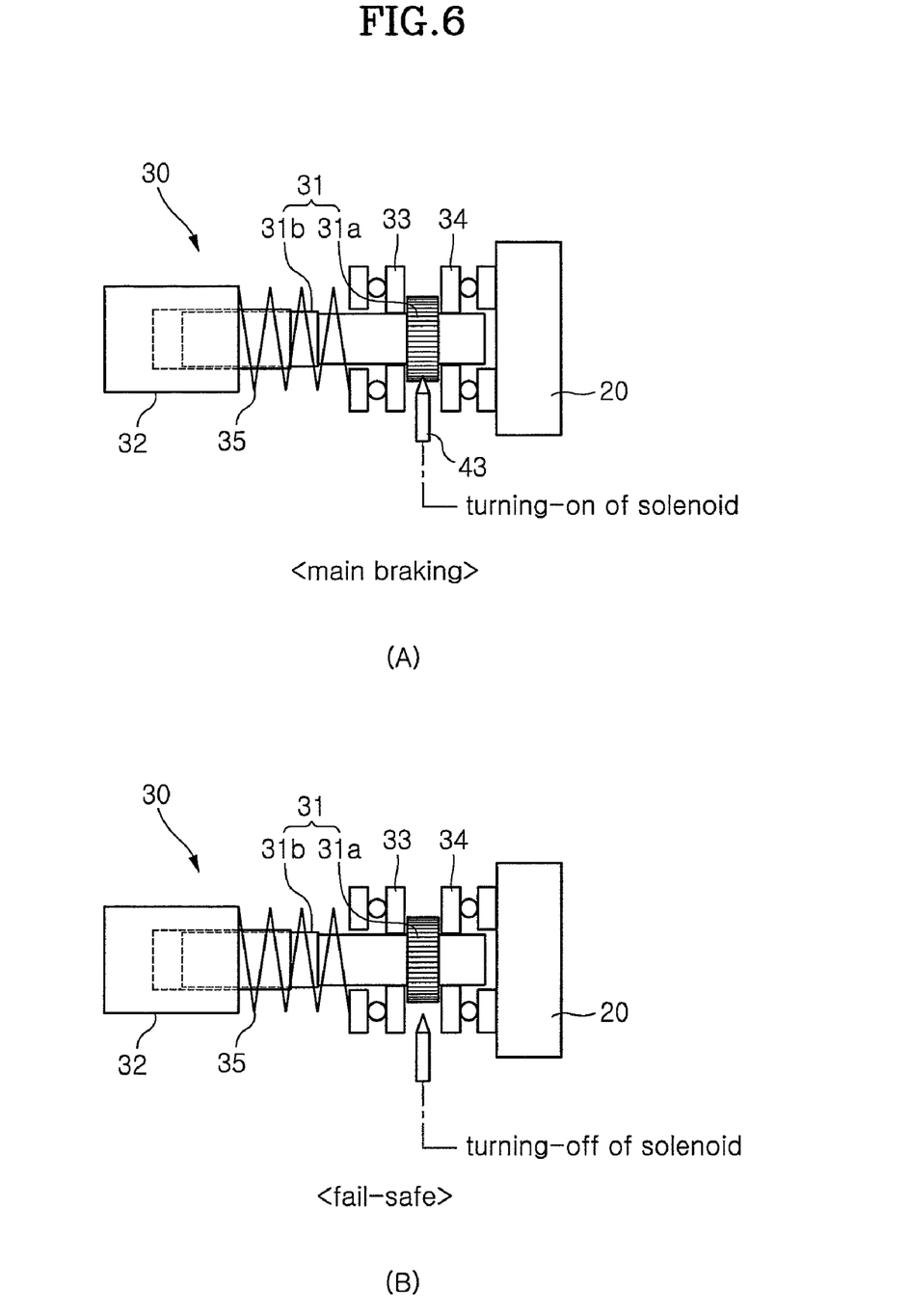
FIGS. 6A and 6B are views illustrating Fail-Safe of the single motor electronic wedge brake system according to the embodiment of the present invention.

That is, as shown in FIG. 6A, solenoid 41, which is turned on during the normal main braking, allows switching lever 43 to be engaged with latch 31a of push rod shaft 31 so as to constrain push rod shaft 31 so that a braking force is maintained. However, when ECU 2 perceives the malfunction of motor 13 or a wheel lock phenomenon, ECU 2 turns off solenoid 41 and separates switching lever 43 from latch 31a as shown in FIG. 6B. Accordingly, the state of the brake system is converted into a wheel lock prevention state for releasing the constraint of push rod shaft 31.

When an axial reaction force transmitted from the pad is applied to push rod shaft 31, which is released from the constraint as described above, a wedge effect is released. Accordingly, it is possible to maintain a wheel lock prevention state for preventing undesired braking, which is caused by abnormalities during the braking.

Meanwhile, the function for maintaining a set clearance of a pad among various additional functions implemented by the EWB is a function for always maintaining a clearance that is set between the pad and wheel disk 5 during initial assembling, and may be implemented in various ways. For example, the function for maintaining a set clearance may be implemented in the following manner. That is, an adjustment for maintaining the set clearance is performed by adjusting a clearance between the pad and wheel disk 5 whenever an engine is started. Alternatively, ECU 2 detects pad abrasion and compensation is then performed to maintain a set clearance between the pad and wheel disk 5.

Figure 7:
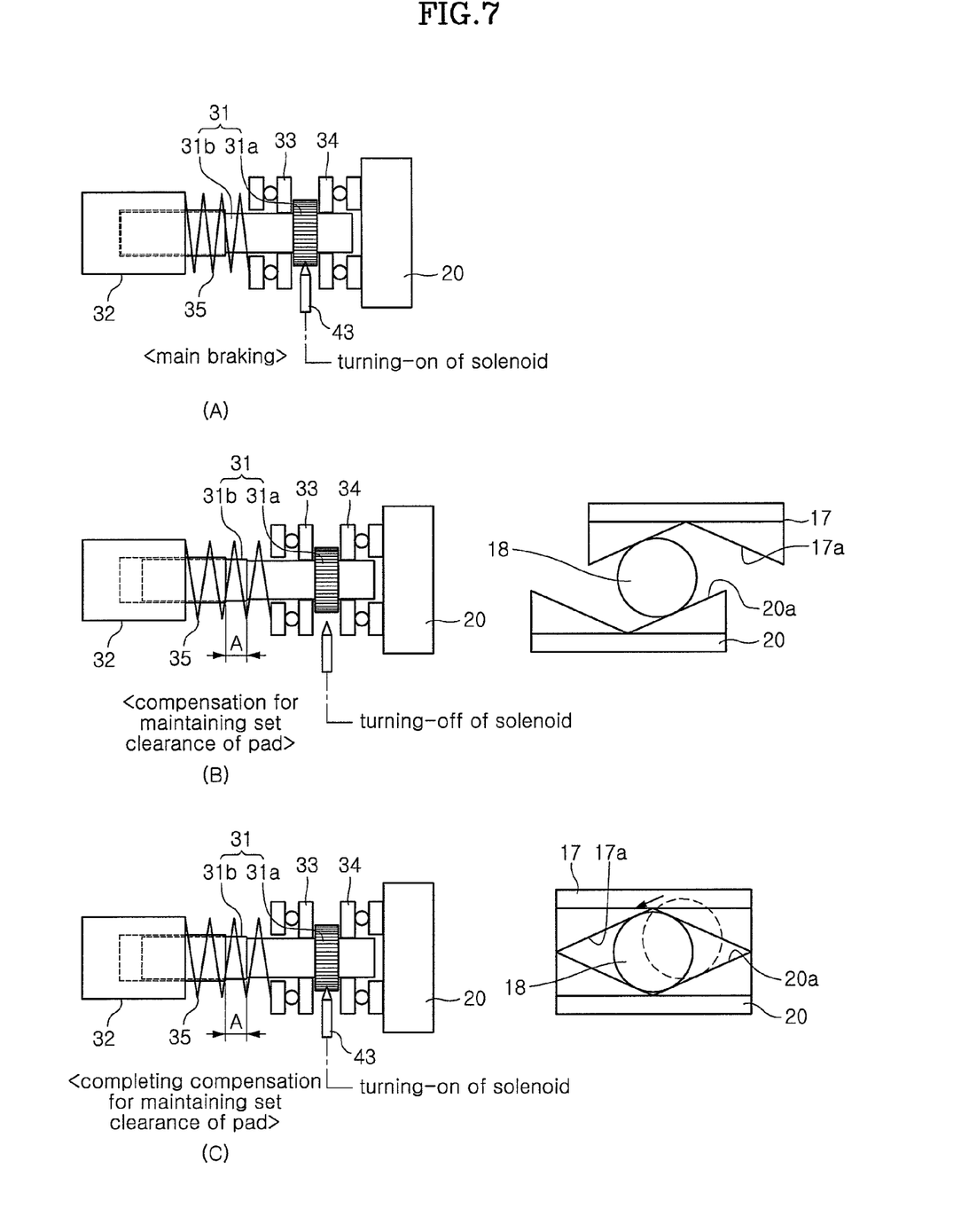
FIGS. 7A to 7C are views illustrating the operation of an axial reaction force supporting NSL (Non-Self Locking) screw according to the embodiment of the present invention while the set clearance of the pad according to the embodiment of the present invention is maintained.
Figure 8:
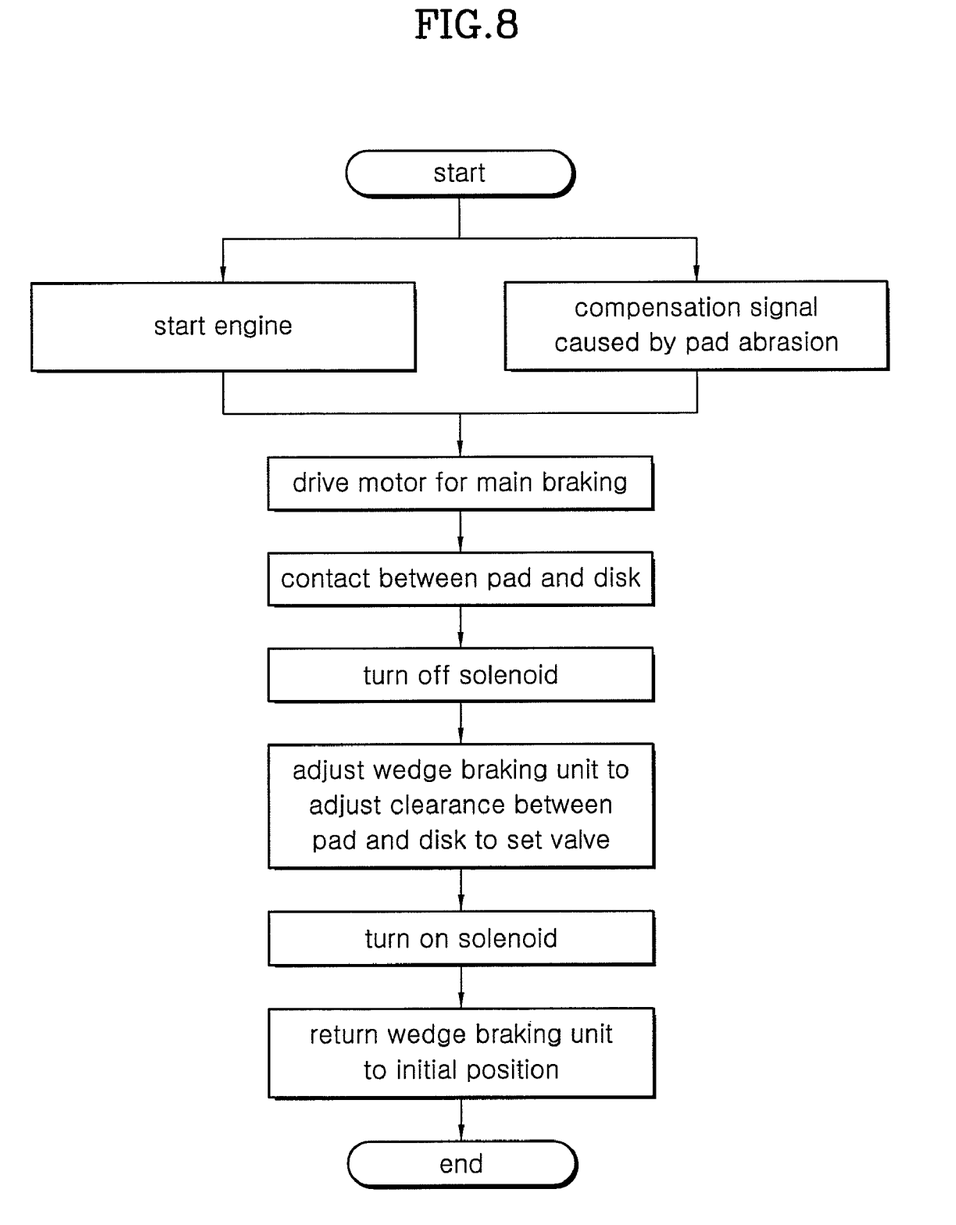
FIG. 8 is a flowchart illustrating a compensating operation while a set clearance of a pad as shown in FIG. 7.

When the adjustment for maintaining an initial set clearance between wheel disk 5 and the pad is performed in the starting of the engine, as shown in FIGS. 7 and 8, the engine is started and ECU 2 drives motor 13. As shown in FIG. 7A, the driving force of motor 13 causes a wedge operation by wedge moving plate 17, wedge roller 19, and wedge base plate 20 due to the operation of spindle assembly 50, like during the main braking. Therefore, inner and outer pads 7 and 8 come in close contact with the both surfaces of wheel disk 5.

Since inner and outer pads 7 and 8 come in close contact with the both surfaces of wheel disk 5 as described above, clearances between inner and outer pads 7 and 8 and wheel disk 5 do not exceed the set clearance.

Subsequently, as shown in FIG. 7B, ECU 2 turns off solenoid 41 so as to release the solenoid constraining force of push rod shaft 31. Due to the release of the constraining force of push rod shaft 31, the NSL (Non-Self Locking) screw type push rod shaft 31 is moved in the axial direction by spring 35.

In this case, push rod shaft 31 is moved forward until the push rod shaft protrudes from supporting nut 32 by a distance A. The distance A is a clearance required for push rod shaft 31 to come in contact with and support wedge base plate 20 so that inner and outer pads 7 and 8 coming in close contact with the both surfaces of wheel disk 5 are maintained. The distance A is changed depending on the specification of the single motor electro wedge brake.

Subsequently, push rod shaft 31, which has moved forward, comes in contact with wedge base plate 20, ECU 2 drives motor 13 again in order to further move wedge moving plate 17 so that the set clearance is ensured between the pads and wheel disk 5.

In this case, when a clearance between the pad and wheel disk 5 is larger than the set clearance, ECU 2 drives motor 13 (referred to as normal rotation) to further move wedge moving plate 17 so that the clearance between the pad and wheel disk 5 corresponds to the set clearance.

However, when the clearance between the pad and wheel disk 5 is smaller than the set clearance, ECU 2 drives motor 13 (referred to as reverse rotation) to pull wedge moving plate 17 (movement in an opposite direction to the moving direction during braking) so that the clearance between the pad and wheel disk 5 corresponds to the set clearance.

The control of motor 13, which is performed by ECU 2, allows the clearance between the pad and wheel disk 5 to always correspond to the set clearance whenever the clearance between the pad and the wheel disk is adjusted.

When the above-mentioned adjustment is completed, ECU 2 turns on solenoid 41 and allows switching lever 43 to be engaged with latch 31a so that the state of push rod shaft 31, which is moved forward by a distance A, is converted into the stationary state as shown in FIG. 7C.

After the state of push rod shaft 31 is converted into a stationary state by solenoid 41 as described above, ECU 2 drives motor 13 in the reverse direction. Accordingly, the states of wedge base plate 20, wedge roller 19, and wedge moving plate 17 are converted into the initial states. For this reason, clearances between inner and outer pads 7 and 8 and wheel disk 5 do not exceed the set clearance. Therefore, it is possible to maintain a constant braking force by the wedge effect of wedge roller 19, which is implemented during the braking.

The starting of the engine and processes for maintaining a clearance of a pad are not performed at the same time. Further, when ECU 2 perceives pad abrasion, processes for maintaining a clearance are also similarly performed. However, except for only whether the starting of the engine and the drive of motor 13 are performed at the same time, all of the processes are similarly performed by a procedure shown in FIG. 8. For this reason, the detailed description thereof will be omitted.

Meanwhile, since the state of solenoid 41 is converted into a turning-off state, the function for maintaining braking, which is implemented by the EWB during the operation of the electric parking brake (EPB), is implemented by constraining push rod shaft 31 with spindle assembly 50 that converts the torque of motor 13 into the axial moving force.

That is, when ECU 2 perceives the conversion into the park braking state (a method of transmitting a signal to the ECU by using a button or methods similar thereto are used), ECU 2 turns off solenoid 41 to allow switching lever 43 to be separated from latch 31a, thereby releasing the constraint of push rod shaft 31.

As the constraint is released by solenoid 41 as described above, push rod shaft 31 to which the force of spring 35 is applied is loosened from supporting nut 32 and moved forward. The forward movement of push rod shaft 31 causes rear bearing 34 to push wedge base plate 20. Accordingly, wedge moving plate 17 at which wedge roller 19 is positioned and inner pad 7 fixed thereto are pushed against wheel disk 5.

Subsequently, while the pad and wheel disk 5 come in contact with each other due to the forward movement of push rod shaft 31, which is caused by the turning-off of solenoid 41, ECU 2 drives motor 13 to perform control so that the NSL (Non-Self Locking) unit of spindle assembly 50 is moved to the main brake spindle moving region A in the axial direction.

When the NSL (Non-Self Locking) unit is moved to the main brake spindle moving region A in the axial direction as described above, wedge moving plate 17, wedge roller 19, and wedge base plate 20, which are moved by interlocking rod 15 and connecting rod 18, cause a wedge operation. The wedge operation causes inner and outer pads 7 and 8 to be pressed against wheel disk 5, so that the state of the brake system is converted into the same state as during the main braking.

In this case, the operation between sun screw 56 and NSL screw 53 of the NSL (Non-Self Locking) unit, and the operation among sun screw 56, planetary screw set 55 and NSL screw 53 are the same as during the above-mentioned main braking. Therefore, the descriptions thereof will be omitted.

Subsequently, ECU 2 further drives motor 13 so that the NSL (Non-Self Locking) unit is moved to the EPB spindle moving region B over the main brake spindle moving region A.

Figure 9:
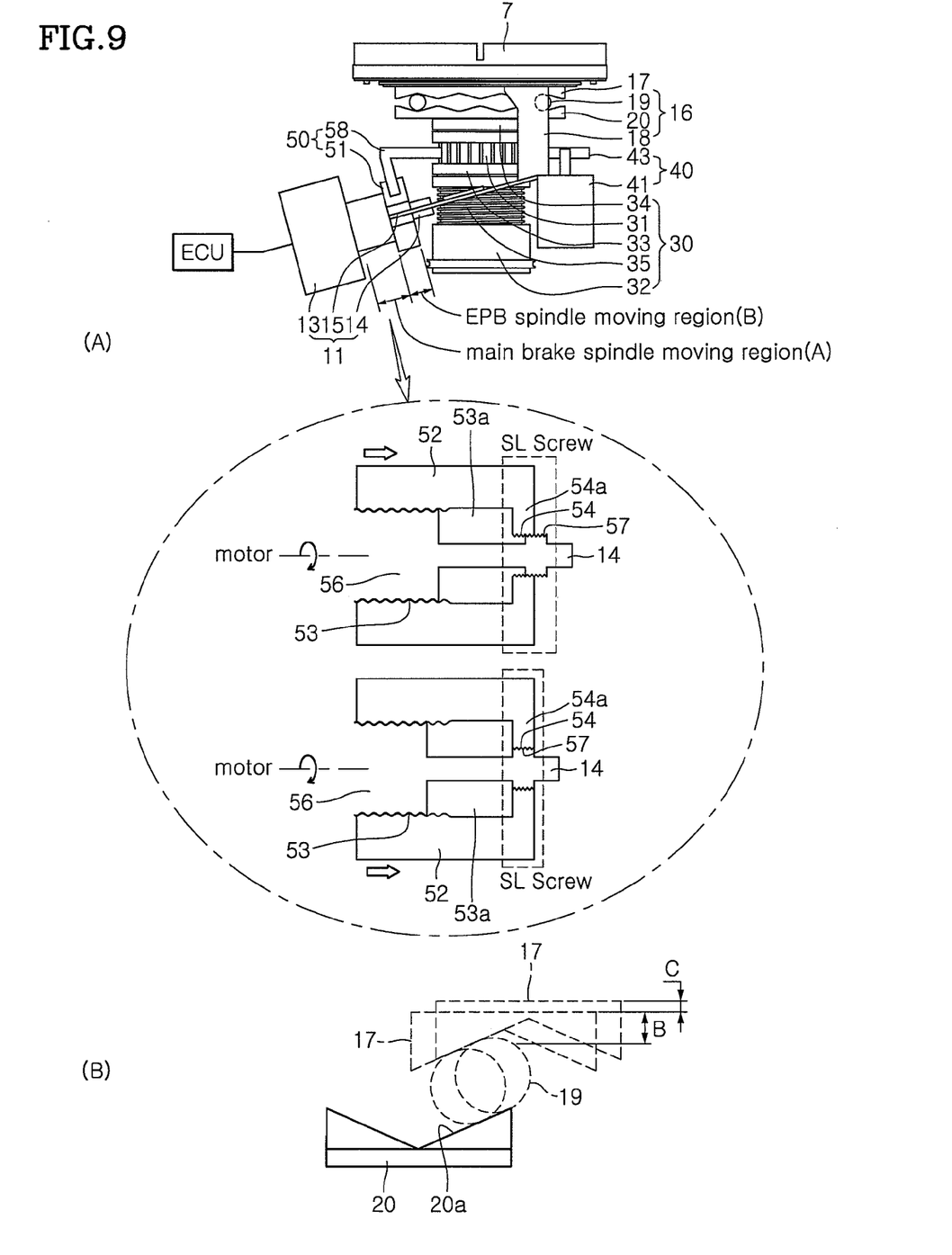
FIGS. 9A and 9B are views illustrating the operation of the motor assembly and the NSL (Non-Self Locking) screw when an electronic parking brake applied to the present invention operates.

As shown in FIG. 9A, the rotation of motor 13 causes case body 52 to be further moved forward by the NSL (Non-Self Locking) unit, so that the SL screw unit operates. Further, the rotation of the motor causes EPB lever 58, which is fixed to case body 52, to approach push rod shaft 31.

That is, the NSL (Non-Self Locking) unit is moved in the axial direction to the EPB spindle moving region B over the main brake spindle moving region A. Accordingly, while being rotated due to the NSL screw, case body 52 including NSL screw 53 is moved to the EPB spindle moving region B by the torque of NSL screw 53, which is engaged with sun screw 56 formed on motor connecting shaft 14 (or by planetary screw set 55, which is a NSL screw).

When case body 52 is moved in the axial direction to the EPB spindle moving region B, the SL (Self Locking) unit formed at the front side of the NSL (Non-Self Locking) unit operates. Stationary SL screw 54 formed at the end portion of case body 52 is engaged with movable SL screw 57 formed on motor connecting shaft 14. Case body 52 is fixed due to the engagement between the screws 54 and 57, so that the SL (Self Locking) unit operates.

In this case, since case body 52 including stationary SL screw 54 is moved linearly and motor connecting shaft 14 including movable SL screw 57 is rotated, stationary SL screw 54 is screwed to movable SL screw 57.

Since the screws 54 and 57 of the SL (Self Locking) unit are engaged with each other and case body 52 is moved in the axial direction to the EPB spindle moving region B, EPB lever 58 fixed to case body 52 is engaged with latch 31a of push rod shaft 31.

Since EPB lever 58 is engaged with latch 31a of push rod shaft 31, push rod shaft 31 maintains a sufficient force for pressing the pad instead of the turned off solenoid 41. Accordingly, it is possible to maintain a more stable park braking state as compared to during the park braking.

As shown in FIG. 9B, the park braking causes wedge moving plate 17, which has been moved by a distance B by push rod shaft 31, to be further moved by a distance C, like during the main braking. Accordingly, inner pad 7 fixed to wedge moving plate 17 presses wheel disk 5. As a result, a park braking force is generated.

Since spindle assembly 50 moves the NSL (Non-Self Locking) unit in the axial direction to the EPB spindle moving region B over the main brake spindle moving region A as described above, the pad is further moved for the park braking and push rod shaft 31 is moved forward. Then, EPB lever 58 of spindle assembly 50 is moved to be engaged with latch 31a of push rod shaft 31.

For this reason, even if a constraining force of the turned off solenoid 41 is not applied to push rod shaft 31 during the parking of a vehicle, push rod shaft 31 is strongly constrained by the constraining force caused by latch 31a engaged with EPB lever 58. As a result, it is possible to maintain a more stable park braking force.

What is claimed is:

1. A single motor electronic wedge brake system locking parking force, comprising:
a wedge structure that performs self-energizing by using a wedge roller when one of an inner pad and an outer pad is pressed against a wheel disk by using power generated from one motor driven by an electronic pedal used to brake a vehicle and an ECU receiving vehicle information signals;
a non-self locking push rod shaft that supports an axial reaction force transmitted from the one of the inner and outer pads during operation; and
a solenoid that is controlled by the ECU so as to restrain or release the push rod shaft,
wherein the wedge structure for performing self-energizing includes:
the wedge roller that implements a wedge operation between a wedge moving plate, which moves the inner pad of a wedge caliper provided to the wheel disk, and a wedge base plate provided on a side opposite to the wedge moving plate, by using an axial linear motion converted from torque of the motor controlled by the ECU;
the solenoid that includes the push rod shaft, which is positioned at the wedge base plate and has non-self locking threads screwed to a supporting nut having non-self locking threads together with a spring in order to support an axial reaction force transmitted from the one of the inner and outer pads, and a switching lever, which is engaged with or separated from a latch of the push rod shaft in order to restrain or release an axial movement of the push rod shaft as the solenoid is controlled by the ECU; and
a spindle assembly that is connected to the motor, is moved in an axial direction due to the torque of the motor, and is engaged with the push rod shaft to constrain the push rod shaft so that the push rod shaft disperses an axial reaction force transmitted from the supported one of the inner and outer pads toward the motor when the solenoid is turned off during park braking,
the spindle assembly including:
a power converting case surrounding a motor connecting shaft so that the motor connecting shaft passes through the power converting case and the power converting case is moved in an axial direction when the motor is driven;
a non-self locking unit that is provided between the power converting case and the motor connecting shaft passing through the power converting case, is moved in the ranges of a first stroke for main braking and a second stroke for park braking, and has a large lead angle not to be constrained forcibly;
a self locking unit having a lead angle so that the axial movement thereof is forcibly constrained after the self locking unit is moved to the range of the second stroke;
an interlocking rod that transmits an axial moving force for a wedge operation; and
an EPB lever that is moved during the park braking so as to be engaged with the push rod shaft.

2. The electronic wedge brake system as defined in claim 1, wherein the spindle assembly is moved so as to correspond to a main braking axial movement stroke due to the rotation of the motor, and is further moved so as to correspond to a park braking axial movement stroke due to the further driving of the motor.

3. The electronic wedge brake system as defined in claim 1, wherein the non-self locking unit includes:
a non-self locking screw that is formed on an inner surface of a main hole formed in a case body of the power converting case; and
a non-self locking sun screw that is formed on an outer periphery of the motor connecting shaft passing through the main hole.

4. The electronic wedge brake system as defined in claim 1, wherein the non-self locking unit includes:
- a non-self locking screw that is formed on an inner surface of a main hole formed in a case body of the power converting case;
- a non-self locking sun screw that is formed on an outer periphery of the motor connecting shaft passing through the main hole; and
- a planetary screw set that is engaged with the non-self locking screw and the non-self locking sun screw.

5. The electronic wedge brake system as defined in claim 4, wherein the planetary screw set includes a plurality of planetary screws, which is provided between the non-self locking screw and the non-self locking sun screw and engaged with each other.

6. The electronic wedge brake system as defined in claim 1, wherein the self locking unit includes:
- a stationary self-locking screw that is formed at the end portion of the case body; and
- a movable self-locking screw that is formed at a portion of the motor connecting shaft, which protrudes beyond the case body.

7. The electronic wedge brake system as defined in claim 6, wherein the stationary self-locking screw is formed at a small diameter boss that is formed at the end portion of the case body so as to decrease a diameter of the main hole.

8. The electronic wedge brake system as defined in claim 5, wherein the stationary self-locking screw is directly formed on an inner surface of an end portion of the main hole, which passes through the case body.

9. The electronic wedge brake system as defined in claim 1, wherein the EPB lever has a bent shape so that an end portion of the EPB lever corresponds to the latch of the push rod shaft near the motor.

* * * * *